US012749469B2

(12) United States Patent
Lu et al.

(10) Patent No.: US 12,749,469 B2
(45) Date of Patent: Sep. 29, 2026

(54) IMPLEMENTING AUTOMATIC MUSIC AUDIO TRANSCRIPTION

(71) Applicant: Lemon Inc., Grand Cayman (KY)

(72) Inventors: Wei Tsung Lu, Los Angeles, CA (US); Ju-Chiang Wang, Los Angeles, CA (US); Yun-Ning Hung, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 775 days.

(21) Appl. No.: 18/204,855

(22) Filed: Jun. 1, 2023

(65) Prior Publication Data

US 2024/0404494 A1 Dec. 5, 2024

(51) Int. Cl.
*G10H 1/00* (2006.01)

(52) U.S. Cl.
CPC ......... *G10H 1/0066* (2013.01); *G10H 1/0025* (2013.01); *G10H 2210/086* (2013.01); *G10H 2250/311* (2013.01)

(58) Field of Classification Search
CPC ............... G10H 1/0066; G10H 1/0025; G10H 2210/086; G10H 2250/311

(Continued)

(56) References Cited

U.S. PATENT DOCUMENTS

2010/0192755 A1* 8/2010 Morris ................. G10H 1/0025 84/637
2021/0295148 A1* 9/2021 Gonsalves ............. G06N 3/084
(Continued)

FOREIGN PATENT DOCUMENTS

CN 111782864 A * 10/2020 ............. G06N 3/084

OTHER PUBLICATIONS

Simon et al.; "Scaling Polyphonic Transcription with Mixtures of Monophonic Transcriptions"; 23rd Int'l Society for Music Information Retrieval Conf.; 2022; 8 pages.
(Continued)

*Primary Examiner* — Jianchun Qin
(74) *Attorney, Agent, or Firm* — BakerHostetler

(57) ABSTRACT

The present disclosure describes techniques for implementing automatic music audio transcription. A deep neural network model may be configured. The deep neural network model comprises a spectral cross-attention sub-model configured to project a spectral representation of each time step t, denoted as St, into a set of latent arrays at the time step t, denoted as $\theta_t^h$, h representing an h-th iteration. The deep neutral network model comprises a plurality of latent transformers configured to perform self-attention on the set of latent arrays $\theta_t^h$. The deep neural network model further comprises a set of temporal transformers configured to enable communications between any pairs of latent arrays $\theta_t^h$ at different time steps. Training data may be augmented by randomly mixing a plurality of types of datasets comprising a vocal dataset and an instrument dataset. The deep neural network model may be trained using the augmented training data.

20 Claims, 11 Drawing Sheets

(58) Field of Classification Search
USPC .......................................................... 84/609
See application file for complete search history.

(56) References Cited

U.S. PATENT DOCUMENTS

2021/0375023 A1* 12/2021 Kothari .................. G06V 10/82
2024/0161770 A1* 5/2024 Jansson ................ G06N 3/0455

OTHER PUBLICATIONS

Gardner et al.; "MT3: Multi-Task Multitrack Music Transcription"; ICLR; 2022; 21 pages.
Jaegle et al.; "Perceiver: General Perception with Iterative Attention"; 38th Int'l Conf. on Machine Learning; 2021; 14 pages.
Lu et al; "SpecTNT: a Time-Frequency Transformer for Music Audio"; ISMIR; 2021; 8 pages.
Ulrich et al.; "Improving music source separation based on deep neural networks through data augmentation and network blending"; IEEE Int'l Conf. on Acoustics, Speech and Signal Processing; 2017; p. 261-265.
Cheuk et al.; "ReconVAT: A Semi-Supervised Automatic Music Transcription Framework for Low-Resource Real-World Data"; 29th ACM Int'l Conf. on Multimedia; Oct. 2021; p. 3918-3926.
Song et al.; "CatNet: music source separation system with mix-audio augmentation"; Sound; arXiv:2102.09966; Feb. 2021; 5 pages.
Raffi et al.; "An Overview of Lead and Accompaniment Separation in Music"; IEEE/ACM Transactions on Audio, Speech, and Language Processing; 2018; 30 pages.
Hung et al.; "Multitask Learning for Frame-level Instrument Recognition"; IEEE Int'l Conf. on Acoustics, Speech and Signal Processing; 2019; p. 381-385.
Jansson et al.; "Joint Singing Voice Separation and F0 Estimation with Deep U-Net Architectures"; 27th European Signal Processing Conf.; 2019; 5 pages.
Wu et al.; "Multi-Instrument Automatic Music Transcription With Self-Attention-Based Instance Segmentation"; IEEE/ACM Transactions on Audio, Speech and Language Processing; vol. 28; 2020; p. 2796-2809 (abstract only).
Tanaka et al.; "Multi-Instrument Music Transcription Based on Deep Spherical Clustering of Spectrograms and Pitchgrams"; ISMIR; 2020; 8 pages.
Wang et al.; "On the Preparation and Validation of a Large-Scale Dataset of Singing Transcription"; IEEE Int'l Conf. on Acoustics, Speech and Signal Processing; 2021; p. 276-280.
Kum et al.; "Pseudo-Label Transfer from Frame-Level to Note-Level in a Teacher-Student Framework for Singing Transcription from Polyphonic Music"; IEEE Int'l Conf. on Acoustics, Speech and Signal Processing; 2022; 5 pages.
Hsu et al.; "VOCANO: A note transcription framework for singing voice in polyphonic music"; 22nd Int. Society for Music Information Retrieval Conf.; 2021; p. 293-300.
Gulati et al.; "Conformer: Convolution-augmented Transformer for Speech Recognition"; Audio and Speech Processing; arXiv:2005.08100; 2020; 5 pages.
Won et al.; "Semi-Supervised Music Tagging Transformer"; ISMIR; 2021; p. 769-776.
Hung et al.; "Modeling Beats and Downbeats with a Time-Frequency Transformer"; IEEE Int'l Conf. on Acoustics, Speech and Signal Processing; 2022; p. 401-405.
Wang et al.; "To Catch A Chorus, Verse, Intro, or Anything Else: Analyzing a Song with Structural Functions"; IEEE Int'l Conf. on Acoustics, Speech and Signal Processing; 2022; p. 416-420.
He et al.; "Identity Mappings in Deep Residual Networks"; European Conf. on Computer Vison; 2016; p. 630-645.
Hawthorne et al.; "Onsets and Frames: Dual-Objective Piano Transcription": Sound; arXiv:1710.11153; 2017; 8 pages.
Chung et al.; "Empirical Evaluation of Gated Recurrent Neural Networks on Sequence Modeling"; NIPS; arXiv:1412.3555; 2014; 9 pages.
Kum et al.; "Joint Detection and Classification of Singing Voice Melody Using Convolutional Recurrent Neural Networks"; Applied Sciences; vol. 9; 2019; 17 pages.
Manilow et al.; "Cutting Music Source Separation Some Slakh: A Dataset to Study the Impact of Training Data Quality and Quantity"; IEEE Workshop on Applications of Signal Processing to Audio and Acoustics; Oct. 2019; 5 pages.
Hawthorne et al.; "Enabling Factorized Piano Music Modeling and Generation with the MAESTRO Dataset"; Sound ICLR; arXiv:1810.12247; 2018; 12 pages.
Xi et al.; "Guitarset: A Dataset for Guitar Transcription"; 19th International Society for Music Information Retrieval Conference; 2018; p. 453-460.
Kong et al.; "Decoupling Magnitude and Phase Estimation with Deep ResUNet for Music Source Separation"; Proc. of the 22nd Int. Society for Music Information Retrieval Conf.; 2021; 8 pages.
Raffel et al.; "Optimizing DTW-based audio-to-MIDI alignment and matching"; IEEE Int'l Conf. on Acoustics, Speech and Signal Processing; Columbia University; 2016; 222 pages.
Paszke et al.; "PyTorch: An Imperative Style, High-Performance Deep Learning Library"; 33rd Conf. on Neural Information Processing Systems; 2019; 12 pages.
Loshchilov et al.; "Decoupled Weight Decay Regularization"; Machine Learning; arXiv:1711.05101; 2017; 19 pages.
McLeod et al.; "Evaluating Automatic Polyphonic Music Transcription"; 19th International Society for Music Information Retrieval Conference; 2018; p. 42-49.

* cited by examiner

106

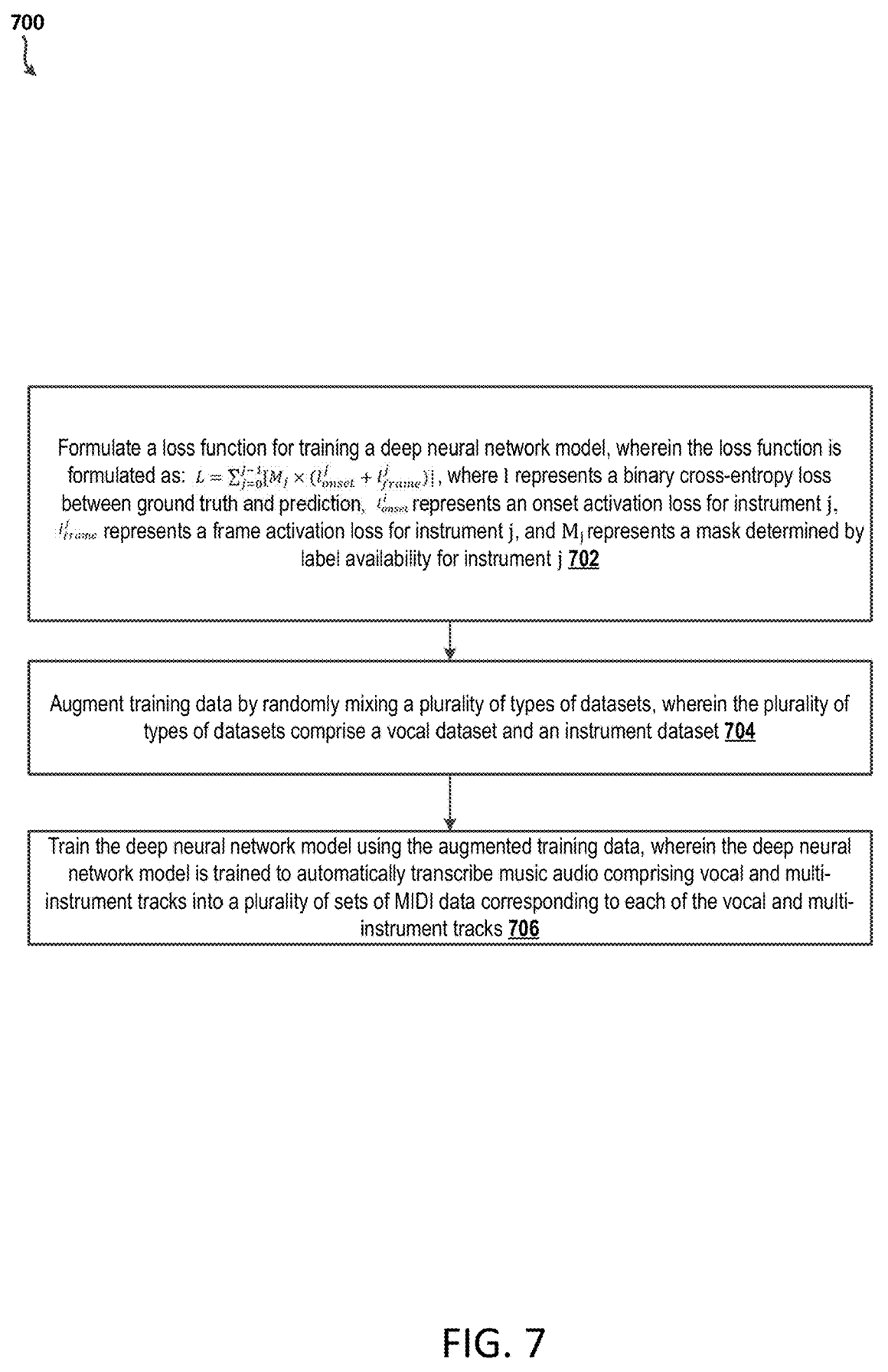

700

Formulate a loss function for training a deep neural network model, wherein the loss function is formulated as: $L = \sum_{j=0}^{J-1}[M_j \times (l_{onset}^j + l_{frame}^j)]$, where l represents a binary cross-entropy loss between ground truth and prediction, $l_{onset}^j$ represents an onset activation loss for instrument j, $l_{frame}^j$ represents a frame activation loss for instrument j, and $M_j$ represents a mask determined by label availability for instrument j 702

↓

Augment training data by randomly mixing a plurality of types of datasets, wherein the plurality of types of datasets comprise a vocal dataset and an instrument dataset 704

↓

Train the deep neural network model using the augmented training data, wherein the deep neural network model is trained to automatically transcribe music audio comprising vocal and multi-instrument tracks into a plurality of sets of MIDI data corresponding to each of the vocal and multi-instrument tracks 706

FIG. 7

900

| Slakh | All | Piano | Bass | Drums | Guitar | Strings | Brass | Organ | Pipe | Reed | S.lead | S.pad | C.perc. |
|---|---|---|---|---|---|---|---|---|---|---|---|---|---|
| MT3[3] | .743 | .780 | .906 | .773 | .732 | .551 | .433 | .363 | .282 | .440 | .409 | .234 | .353 |
| Ours (No-RM) | .763 | .809 | .921 | .759 | .727 | .699 | .632 | .562 | .578 | .649 | .677 | .358 | .458 |
| Ours | **.798** | **.854** | **.930** | **.785** | **.777** | **.744** | **.732** | **.694** | **.666** | **.725** | **.769** | **.474** | **.575** |

FIG. 9

1000

| Dataset | Slakh | MAESTRO | GuitarSet | MIR-ST500 |
|---|---|---|---|---|
| SpecTNT (Single) | - | **.969** | .907 | .778 |
| MT3 (Single) | .760 | .960 | .830 | - |
| MT3 (Mix) | .760 | .950 | .900 | - |
| MT3† (Mix) | .763 | .958 | .891 | - |
| Ours (Single) | .808 | .967 | .903 | .777 |
| Ours (Mix+Vocal) | **.819** | .968 | **.911** | **.785** |
| EFN | - | - | - | .666 |
| $JDC_{note}$(L+U) | - | - | - | .697 |

FIG. 10

IMPLEMENTING AUTOMATIC MUSIC AUDIO TRANSCRIPTION

BACKGROUND

Music information retrieval involves retrieving information from music. Music information retrieval tasks are widely used in music, filmmaking, social media, and entertainment industries. Such tasks may include multi-pitch detection, onset detection, duration estimation, instrument identification, and the extraction of harmonic, rhythmic or melodic information. However, conventional music information retrieval techniques may not be able to fulfill the needs of users due to various limitations. Therefore, improvements in music information retrieval are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows an example process for implementing training a deep neural network model configured for automatic music audio transcription in accordance with the present disclosure.

FIG. 9 shows an example process for tracking beats and downbeats of human voices in real time which may be performed in accordance with the present disclosure.

FIG. 10 shows an example process for tracking beats and downbeats of human voices in real time which may be performed in accordance with the present disclosure.

DETAILED DESCRIPTION OF ILLUSTRATIVE EMBODIMENTS

Music scores serve as a medium between people and music. A music score may include notes from a variety of different instruments. Automatic music transcription (AMT) is a Music Information Retrieval (MIR) task that aims to transcribe a music audio input into a sequence of musical notes. Each musical note in the sequence may be associated with attributes such as onset, pitch, duration, and velocity. The output of the AMT system is typically delivered in the format of a MIDI file. If the music audio input includes sounds from a variety of different instruments, the AMT system should identify every instrument that is present in the music audio input and estimate the associated notes accordingly into a particular channel of the MIDI output. The synthesized audio from the output MIDI may resemble the original input audio in a musically plausible way.

However, AMT is a difficult task. Compared to other music information retrieval (MIR) tasks, AMT has rarely been studied due to a lack of training datasets and the model capability. Existing AMT systems face two major challenges. First, existing AMT systems face a lack of model scalability. The number of commonly used instruments can be up to 100. Among them, musical notes of regular instruments like guitar, violin, and synthesizers are difficult to characterize due to their tremendous variations in timbre, expressivity, and playing techniques. Further, vocals, which usually are the most predominant instrument if present, vary in timbre and pitch to convey lyrics and expressions. Some existing AMT systems use a vanilla Transformer architecture, which only computes self-attentions on the time-axis and is not able to sufficiently capture the spectral features from a variety of instruments. Thus, an AMT system with improved model scalability, which is able to transcribe all instruments simultaneously, is desirable.

Second, existing AMT systems are often unable to discriminate between different instruments. Many existing AMT systems result in false positive notes for popular pitched instruments, such as the piano or the guitar. For example, notes of a string ensemble may be massively captured by the piano. This may occur if the AMT system does not provide clear timbre-dependent features and/or if the AMT system is not robust to timbral variations across different instruments. Further, existing AMT systems mostly focus on transcription of regular instruments, neglecting vocals. However, vocals are usually one of the most important signal sources in a piece of music if present. Thus, an AMT system with an improved ability to discriminate between different instruments and vocals is desirable.

Figure 1:
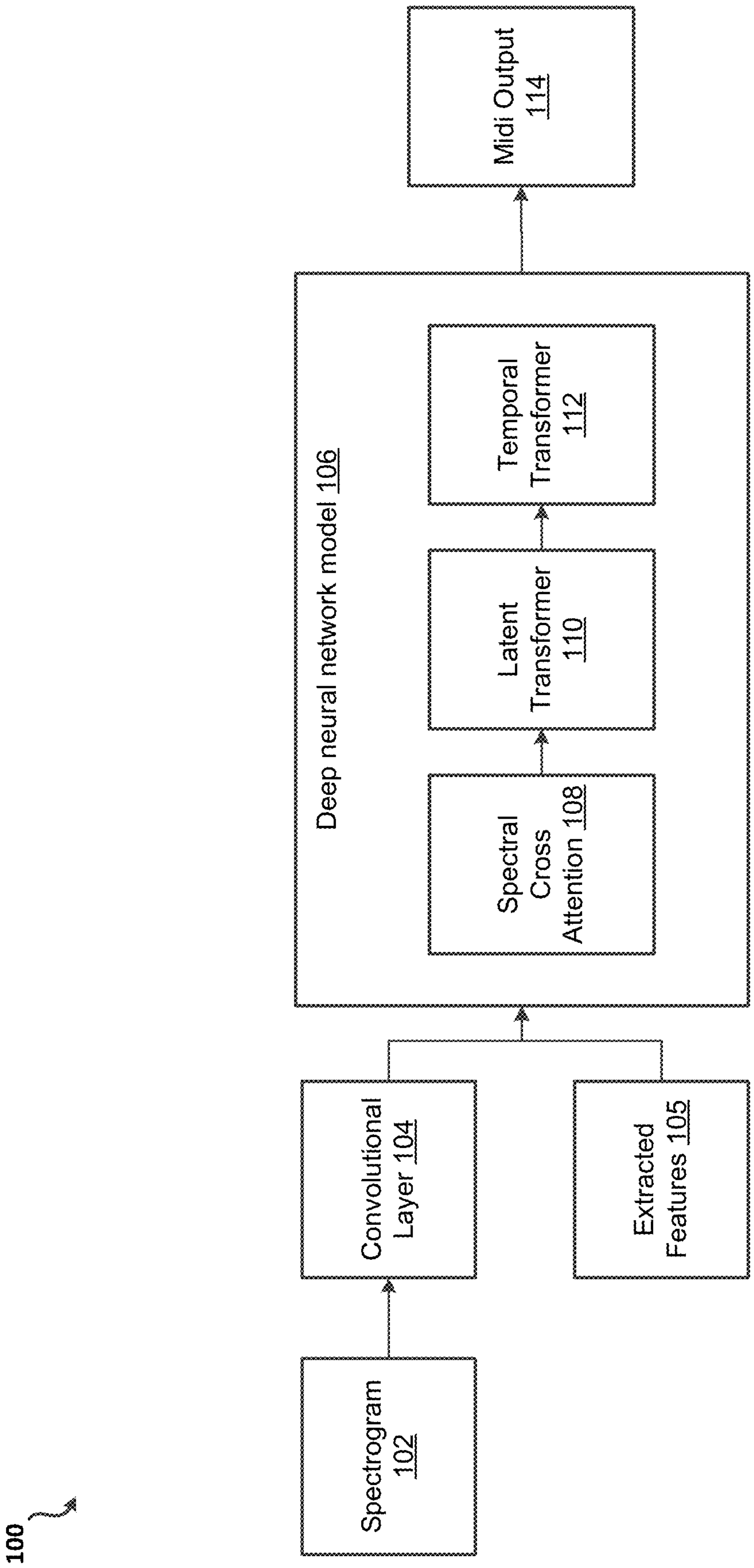
FIG. 1 shows an example system for implementing automatic music audio transcription in accordance with the present disclosure.

Described herein is an improved AMT system. The AMT system described herein has improved model scalability. Further, the AMT system described herein has an improved ability to discriminate between different instruments and vocals. FIG. 1 illustrates an example system 100 in accordance with the present disclosure. The system 100 may be used for implementing automatic music audio transcription. The system 100 may comprise a convolutional model 104 and a deep neural network model 106.

A spectrogram 102 may be created (e.g., generated). The spectrogram 102 may be created based on a piece of music audio. The piece of music audio may comprise a song or a portion of a song. The piece of music audio may comprise vocals and/or a plurality of different instrumental sounds. The vocals may represent a human voice (e.g., singing and/or talking). It is to be noted that the human voice is received only when it is authorized by the owner of the human voice to be used (including, but not limited to, receiving, processing, and so on). Each of the plurality of different instrumental sounds may correspond to a different instrument featured in the piece of music audio. The instruments may comprise one or more of a guitar, a piano, drums, bass, cello, violin, piccolo, flute, trumpet, harmonica, xylophone, saxophone, harp, and/or any other instruments. The spectrogram 102 may comprise a visual representation of the spectrum of frequencies of the piece of music audio as it varies with time. The spectrogram 102 may be input into the convolutional model 104.

The spectrogram 102 may be passed through the convolution layer 104 for local feature aggregation. The convolutional model 104 may comprise a convolutional neural network (CNN). The convolutional model 104 may comprise multiple stacked residual units with average pooling to reduce the dimensionality of the frequency axis. The resulting time-frequency representations may be denoted as $S=[S_0, S_1, \ldots, S_{T-1}] \in \mathbb{R}^{T \times F \times C}$, where T, F, and C represent the dimensions of time, frequency, and channel, respectively.

The convolutional model 104 may be configured to transform the spectrogram 102 into a plurality of spectral representations. Each of the plurality of spectral representations may correspond to a particular time step of the piece of music audio. Each time step may comprise a predetermined number of seconds or milliseconds of the piece of music audio. For example, the convolutional model 104 may transform the spectrogram 102 into a first spectral representation corresponding to a first time step of the piece of music audio, a second spectral representation corresponding to a second time step of the piece of music audio, a third spectral representation corresponding to a third time step of the piece of music audio, and so on.

Figure 2:
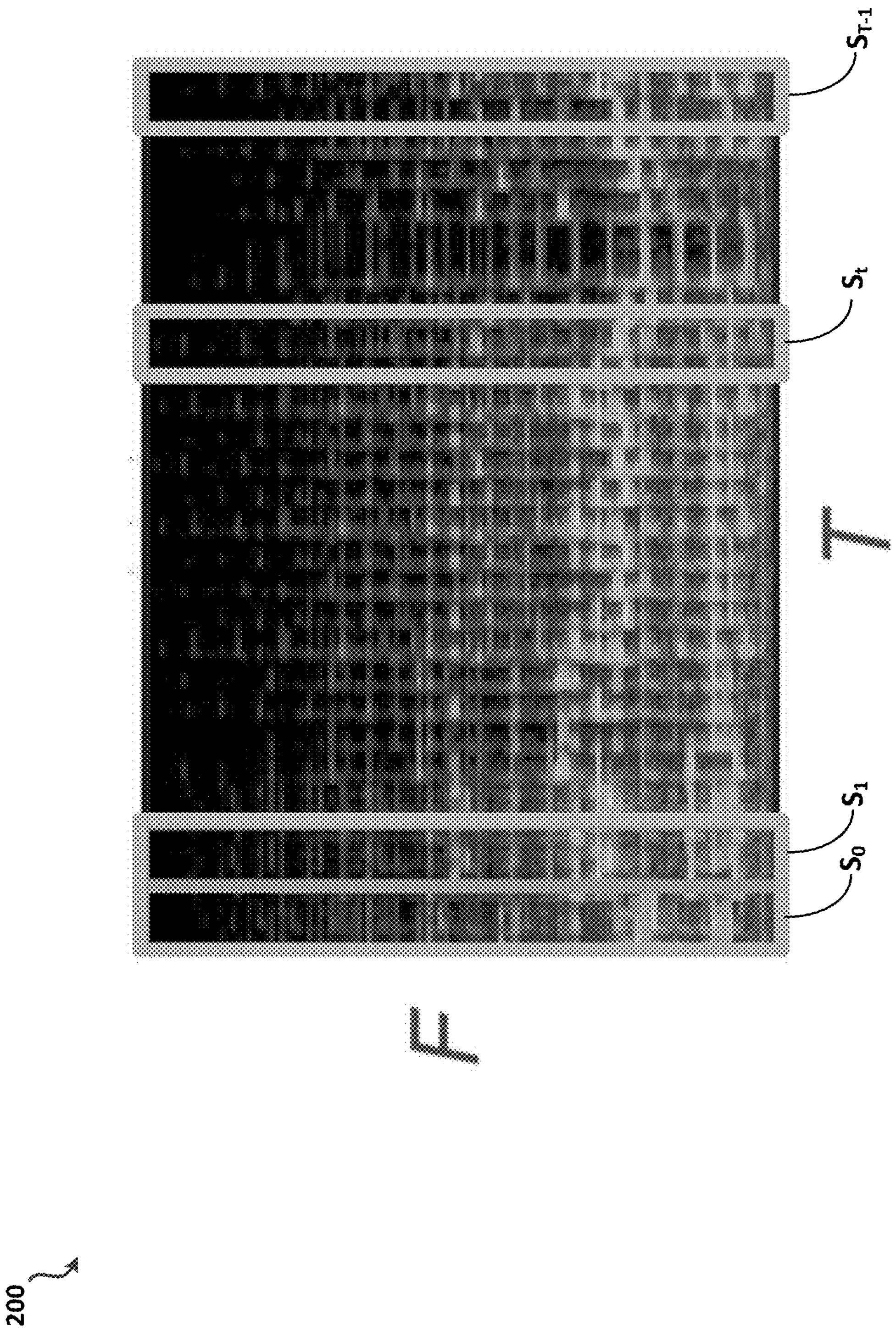
FIG. 2 shows an example transformed spectrogram in accordance with the present disclosure.

FIG. 2 shows an example plurality of spectral representations 200 generated by the convolutional model 104. The plurality of spectral representations $S_t$ may have been generated by the convolutional model 104 based on the spectrogram 102. The plurality of spectral representations carry pitch and timbral information. The plurality of spectral representations may comprise a first spectral representation $S_0$, a second spectral representation $S_1, \ldots, S_t, \ldots$, and $S_{T-1}$. The first spectral representation $S_0$ may correspond to a first time step of the piece of music audio, the second spectral representation $S_1$ may correspond to the second time step of the piece of music audio, and so on. T and F may represent the lengths of the time- and frequency-axes, respectively.

Referring back to FIG. 1, extracted features 105 may be generated. The features 105 may be extracted from the piece of music audio that corresponds to the spectrogram 102. The extracted features 105 may be generated by extracting audio features from the piece of music audio. The extracted features 105 may comprise, for example, pitch, duration, absolute pitch distance below, absolute pitch distance above, onset position in bar, pitch in scale, etc. The extracted features may be mapped into latent arrays $\theta_t^0$, wherein t represents each time step, and 0 represents an initialization of the latent arrays.

The deep neural network model 106 may comprise a spectral cross-attention sub-model 108, a latent transformer sub-model 110, and a temporal transformer sub-model 112. The deep neural network model 106 may utilize the plurality of spectral representations generated by a convolutional neural network, e.g., the convolutional layers 104, and a sequence of sets of latent arrays, e.g., the latent arrays $\theta_t^0(k)$, to generate a MIDI output 114. For example, the deep neural network model 106 may identify every instrument that is present in the music audio input and estimate the associated notes accordingly into a particular channel of the MIDI output 114. The synthesized audio from the output MIDI may resemble the original input audio in a musically plausible way.

The deep neural network model 106 takes advantage of cross-attention to extract spectral features into a latent bottleneck for each frame and adds an additional Transformer for self-attention along the time axis, overall resulting in a quadratic complexity of $\mathcal{O}(TF^2+T^2)$. Since F is typically large, this complexity reduction is significant, allowing the deep neural network model 106 to handle more instruments simultaneously.

Figure 3:
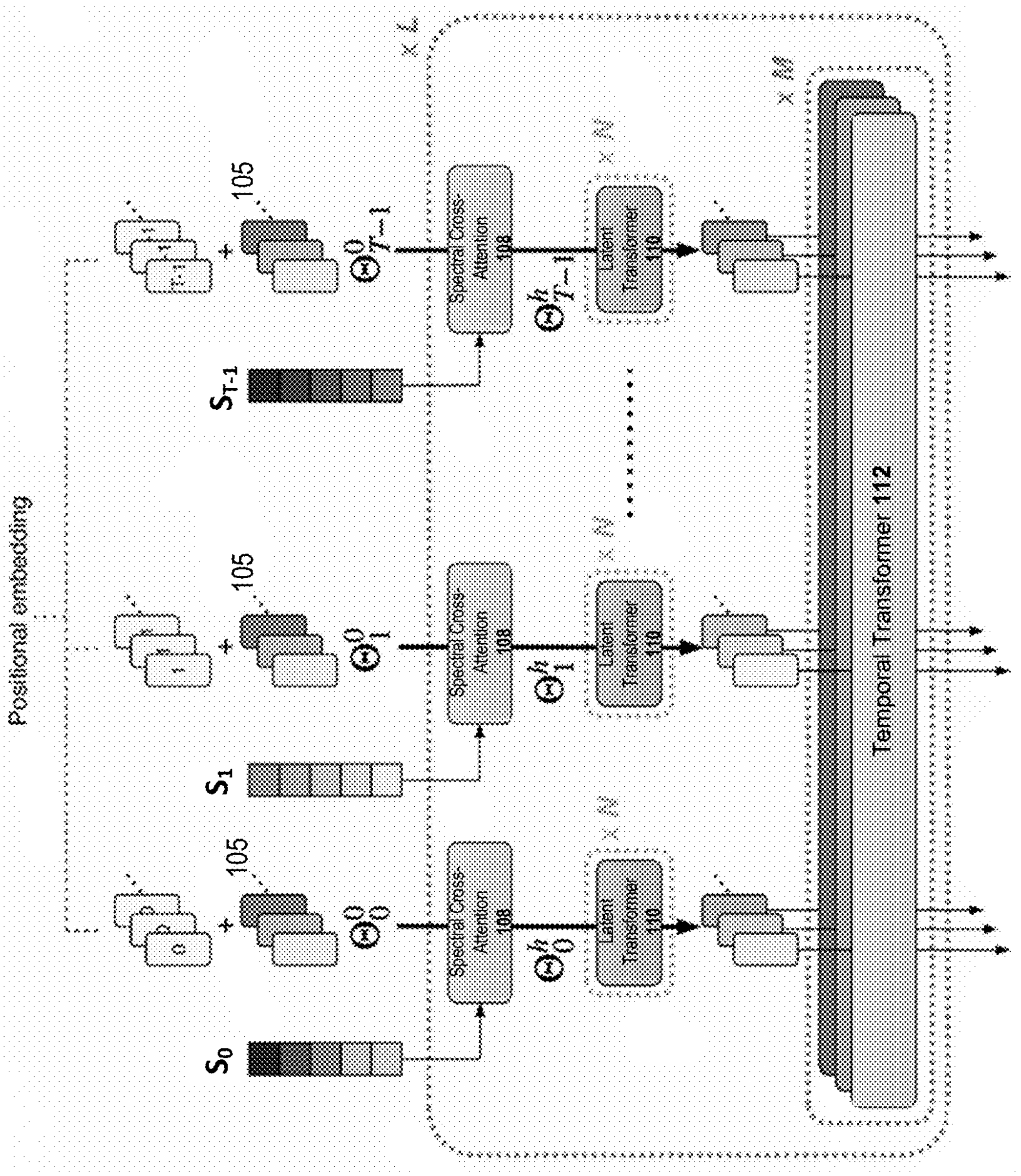
FIG. 3 shows an example deep neural network model for implementing automatic music audio transcription in accordance with the present disclosure.

FIG. 3 is an example architecture of the deep neural network model 106. The plurality of spectral representations $S_t$ (e.g., $S_0, S_1, \ldots, S_{t-1}$) and the latent arrays $\theta_t^0$ 105 may be input into the spectral cross-attention (SCA) sub-model 108. The SCA sub-model 108 may operate directly on each of the input spectral representations $S_t$ and project it into Key (K) and Value (V) matrices. Unlike a traditional Transformer, the SCA sub-model 108 maps a latent array into the Query (Q) matrix and then performs the QKV self-attention accordingly. A set of K learnable latent arrays $\Theta^0 \mathbb{R}^{K \times D}$ may be initialized, where K is the index dimension and D is the channel dimension. Then, the latent arrays $\Theta^0$ may be repeated for T times and associate each to a time step t, denoted as $$\Theta_t^0,$$

such that $$\Theta_0^0 = \Theta_1^0 = \ldots \Theta_{T-1}^0.$$

Thus, all latent arrays may be from the same initialization across the time axis. This $$\Theta_t^h$$

(h representing h-th iteration) plays an important role of carrying the spectral information from the SCA sub-model 108 throughout the entire deep neural network model 106. The query-key-value (QKV) attention of the SCA sub-model 108 of the h-th iteration may be written as:

$$f_{SCA}: \{\Theta_t^h, S_t\} \rightarrow \Theta_t^{(h+1)}.$$

This process may be repeated as the deep neural network model 106 repeats in order to maintain the connection between $$\Theta_t^h$$

and the input $S_t$. The design of the SCA sub-model 108 significantly improves the computational scalability of the deep neural network model 106 as compared to existing AMT systems. For example, the SCA sub-model 108 results in $\mathcal{O}(FK)$, which is much cheaper than $\mathcal{O}(F^2)$ of the spectral Transformer used by an existing technique ("SpecTNT") given that K (dimension of the latent array) is typically small (i.e., K<<F).

The outputs of the SCA sub-model 108 may be input into the latent transformer sub-model 110. The latent transformer sub-model 110 may comprise a plurality of latent transformers for refining the latent arrays. The latent transformer sub-model 110 may comprise s a stack of N Transformers to perform self-attention on the latent arrays of $$\Theta_t^h.$$

The resulting complexity $\mathcal{O}(NK^2)$ is efficient. In the context of AMT, this process means the interactions among the onsets, pitches, and instruments are explicitly modeled. To perform multitrack AMT, K latent arrays are initialized and trained, each latent array is trained to handle one specific task. For each instrument, two latent arrays may be arranged to model the onset and frame-wise (pitch) activations, respectively. This leads to K=2J, wherein J is the number of target instruments.

The outputs of the latent transformer sub-model 110 may be input into the temporal transformer sub-model 112. The temporal transformer sub-model 112 may comprise a set of temporal transformers for processing latent arrays associated with each particular track at all time steps to learn temporal coherence, respectively. The temporal transformers may process $\theta_t^h$ of all time steps to model the temporal coherence. The temporal transformers may be placed to enable the communication between any pairs of $\theta_t^h$ of different time steps. To make the temporal transformers understand the time positions of each latent array, a trainable positional embedding may be added to each $\theta_t^h$ during the initialization. Let $\theta_t^h(k)$, k=0, . . . , K−1 denote each latent array in $\theta_t^h$. The temporal transformer sub-model 112 may comprise K parallel transformers. Each of the K parallel transformers may serve a corresponding input sequence of latent arrays:

$$\left[\theta_0^h(k), \theta_1^h(k), \ldots, \theta_{T-1}^h(k)\right].$$

The temporal transformer sub-model 112 may be repeated M times, yielding a complexity of $\mathcal{O}(MT^2)$.

The above process may be repeated L times to form the overall deep neural network model 106. The weights of SCA sub-model 108 and latent transformer sub-model 110 are not shared across the repeated blocks. The output of the deep neural network model 106 may comprise a plurality of sets of MIDI data or file corresponding to each of the vocal and multi-instrument tracks. For example, the deep neural network model 106 may identify every instrument that is present in the music audio input and estimate the associated notes accordingly into a particular channel of the MIDI output. The synthesized audio mixture from the output MIDI resembles the original input audio in a musically plausible way.

To ensure that the deep neural network model 106 has an improved ability to discriminate between different instruments and vocals, the deep neural network model 106 may be trained using augmented training data. The augmented training data may be generated using a random-mixing augmentation technique. The random-mixing augmentation technique aims to separate each instrument stem from the input audio mixture. Instead of using pseudo labels, the combination of different datasets may be used to create more accurate data samples. The deep neural network model 106 may be trained in a multi-task learning fashion, with each sub-task modeling the transcription of an instrument or vocal. This multi-task design along with the random-mixing technique allows more flexibility to train with enormous amounts of augmented training samples.

Figure 4:
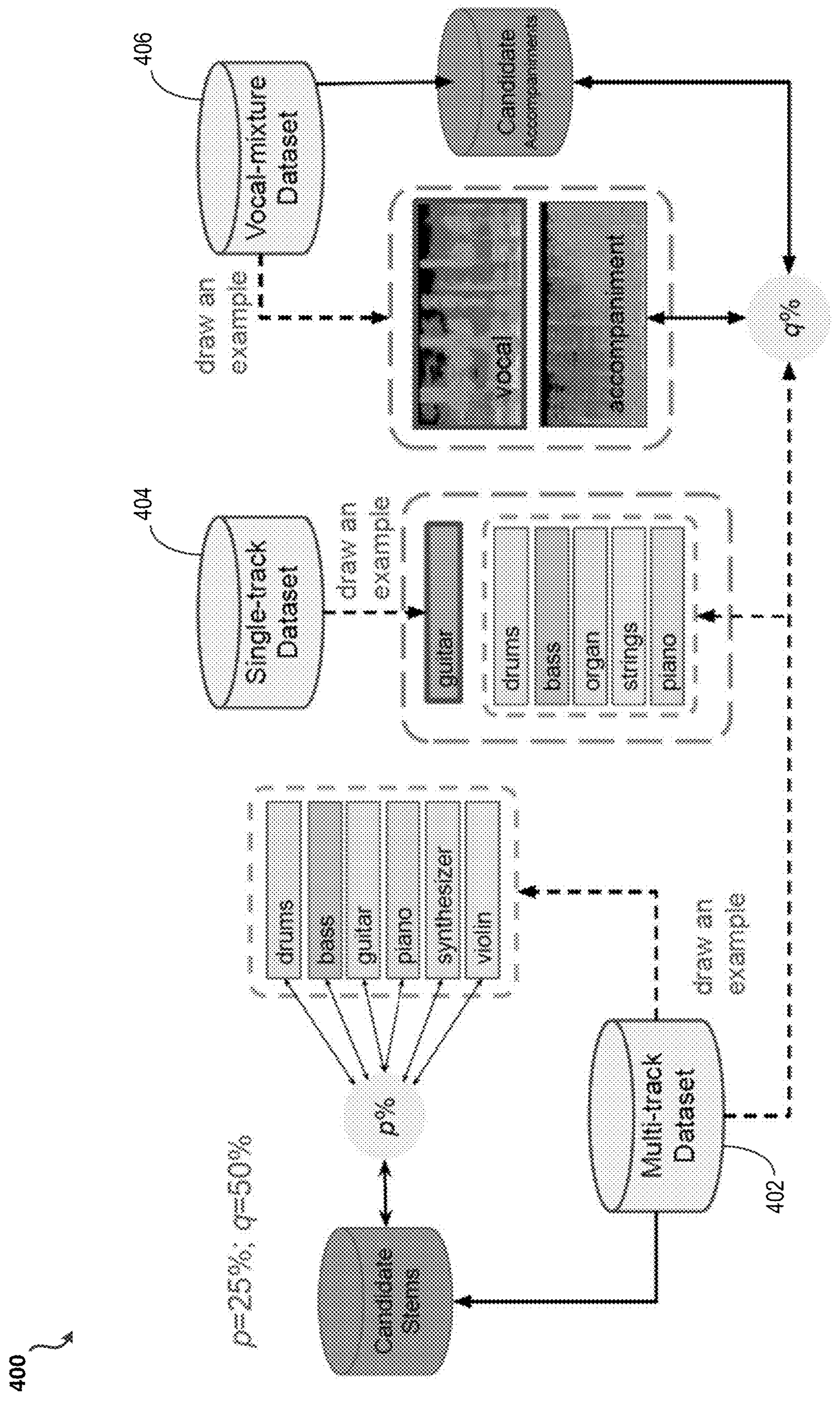
FIG. 4 shows an example system for augmenting training data in accordance with the present disclosure.

FIG. 4 shows an example system 400 for augmenting training data using a cross-dataset random-mixing (RM) technique. Annotating data for multi-track AMT is labor intensive. To better exploit the data at hand, two data augmentation techniques may be applied during training. Pitch-shifting may be randomly performed to all non-percussive instruments during training. Three different types of datasets may be used for the cross-dataset RM technique. The first type of dataset may comprise a multi-track dataset 402. In the multi-track dataset 402, each sample contains multi-tracks of instrument-wise audio stems with polyphonic notes. No vocal signals are present in the multi-track dataset 402. The second type of dataset may comprise a single-track dataset 404. Each sample in the single-track dataset 404 contains only a single non-vocal stem with polyphonic notes. The third type of dataset may comprise a vocal-mixture dataset 406. Each sample in the vocal-mixture dataset 406 is a full mixture of music with monophonic notes only for the lead vocals. A music source separation (MSS) tool may be employed to separate each sample into vocal and accompaniment stems.

Each training sample may be excerpted from a random moment of its original song with a duration depending on the model input length (e.g., 6 seconds). To transcribe J classes of instruments, the corresponding instrument set may be denoted as $$\Omega = \{\omega_j\}_{j=0}^{J-1}.$$

Then, three treatments may be introduced for the three different types of datasets, respectively.

First, for a training example $s_i$ from the multi-track dataset 402, its instrumentation template may be denoted as $\mu_i \subseteq \Omega$, indicating the instruments present in $s_i$. Then, for each instrument $\omega_j$ in $\mu_i$, there is a p % chance that it is replaced by a $\omega_j$ in $\mu_u$, where i≠u (i.e., a different example). Second, for an example $s_i$ from the single-track dataset 404, an existing instrumentation template $\mu_u$(i≠u) may be randomly selected as its background. If the instrument of $s_i$ is present in μu, that stem may be removed from $\mu_u$. For instance, if $s_i$ is a piano solo, then the piano stem may be removed from $\mu_u$. Presenting the solo example to model training without mixing it with a background may degrade the performance. Lastly, for an example $s_i$ from the vocal-mixture dataset 406, it has a q % chance to replace its background by at least one of two methods: (i) like the treatment for the single-track dataset 404, an existing $\mu_u$(i≠u) may be randomly selected as its background; or (ii) an accompaniment stem separated from $s_v$, where i≠v may be randomly selected. For the second method, since the selected accompaniment stem does not have the ground-truth notes, the instrument outputs may be masked and only the loss for the vocal output may be counted.

The following loss function may be used for training the deep neural network model 106 on the augmented dataset:

$$\mathcal{L} = \sum_{j=0}^{J-1}\left[M_i \times \left(l_{onset}^j + l_{frame}^j\right)\right] \qquad (1)$$

where l represents the binary cross-entropy loss between the ground-truth and prediction, $$l_{onset}^j$$

and $$l^j_{frame}$$

are the onset and frame activation loss for instrument j, and Mj is the mask determined by the availability of the label for instrument j.

Figure 5:
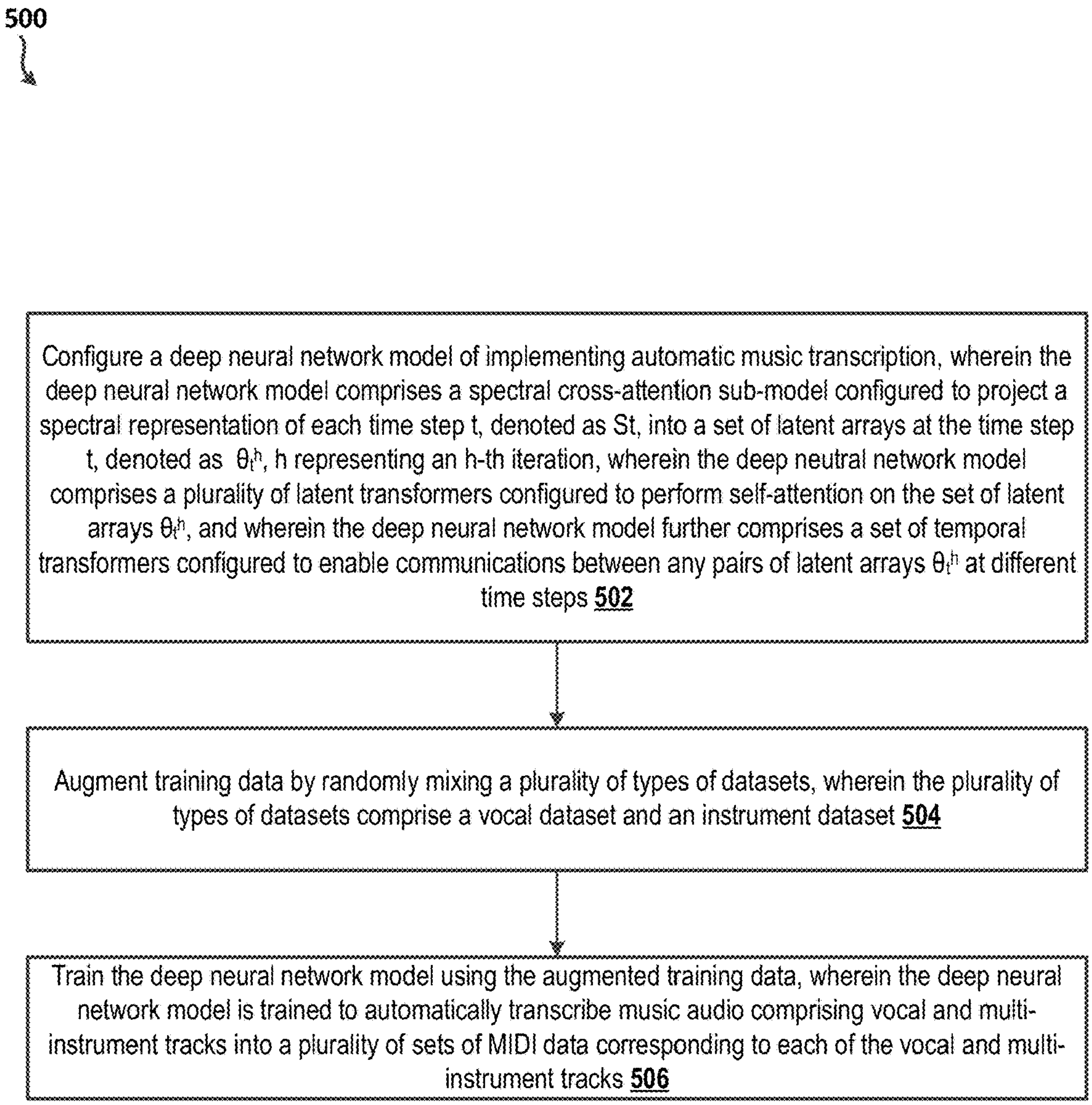
FIG. 5 shows an example process for implementing automatic music audio transcription in accordance with the present disclosure.

FIG. 5 illustrates an example process 500 for implementing automatic music audio transcription. Although depicted as a sequence of operations in FIG. 5, those of ordinary skill in the art will appreciate that various embodiments may add, remove, reorder, or modify the depicted operations.

At 502, a deep neural network model of implementing automatic music transcription may be configured. The deep neural network model may comprise a spectral cross-attention sub-model, a latent transformer sub-model, and a temporal transformer sub-model. The deep neural network model may take advantage of cross-attention to extract spectral features into a latent bottleneck for each frame and adds an additional Transformer for self-attention along the time axis, overall resulting in significant complexity reduction, thereby allowing the deep neural network model to handle more instruments and vocals simultaneously.

The spectral cross-attention sub-model may be configured to project a spectral representation of each time step t, denoted as $S_t$, into a set of latent arrays at the time step t, denoted as $\theta_t^h$, h representing an h-th iteration. The latent transformer sub-model may comprise a plurality of latent transformers configured to perform self-attention on the set of latent arrays $\theta_t^h$. The latent transformer sub-model may further comprise a set of temporal transformers configured to enable communications between any pairs of latent arrays $\theta_t^h$ at different time steps.

At 504, training data may be augmented. The training data may be augmented by randomly mixing a plurality of types of datasets. The plurality of types of datasets may comprise a vocal dataset and an instrument dataset. The plurality of types of dataset may comprise a type of multi-track dataset each sample of which contains multi-tracks of instrument audio stems with polyphonic notes. The plurality of types of dataset may comprise a type of single-track dataset each sample of which contains a single non-vocal audio stem with polyphonic notes. The plurality of types of dataset may comprise a type of vocal-mixture dataset each sample of which contains a full mixture of music audio with monophonic notes for a lead vocal. The augmented training data may be generated using a random-mixing augmentation technique. The random-mixing augmentation technique aims to separate each predefined stem source from the input audio mixture. Instead of using pseudo labels, the combination of different datasets may be used to create more accurate data samples. At 506, the deep neural network model may be trained. The deep neural network model may be trained using the augmented training data. The deep neural network model may be trained to automatically transcribe music audio comprising vocal and multi-instrument tracks into a plurality of sets of MIDI data corresponding to each of the vocal and multi-instrument tracks. The deep neural network model may be trained in a multi-task learning fashion, with each sub-task modeling the transcription of an instrument. This multi-task design along with the random-mixing technique allows more flexibility to train with enormous amounts of augmented training samples.

Figure 6:
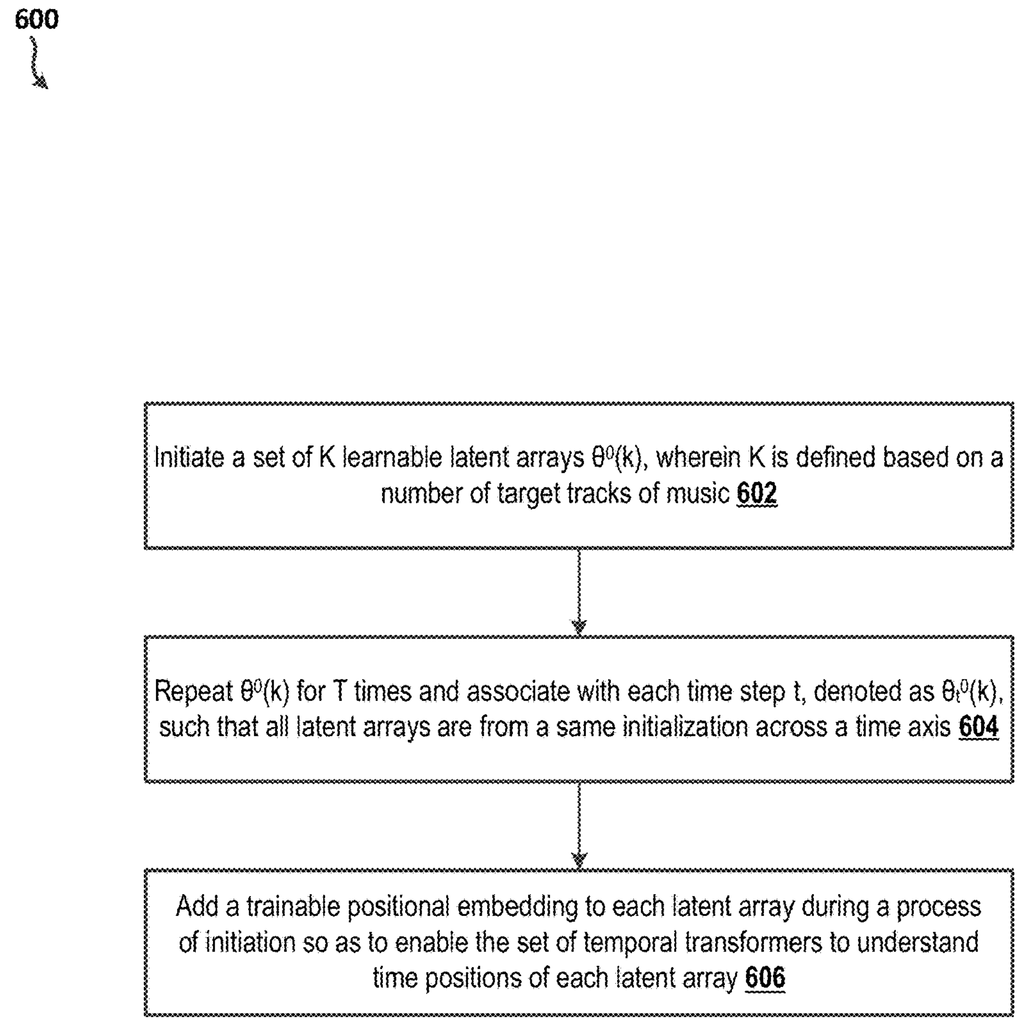
FIG. 6 shows an example process for implementing automatic music audio transcription in accordance with the present disclosure.

FIG. 6 illustrates an example process 600 for implementing automatic music audio transcription. Although depicted as a sequence of operations in FIG. 6, those of ordinary skill in the art will appreciate that various embodiments may add, remove, reorder, or modify the depicted operations.

At 602, a set of K learnable latent arrays $\theta^0(k)$ may be initialized. K is defined based on a number of target tracks of music. For example, a set of K learnable latent arrays $\Theta^0 \mathbb{R}^{K\times D}$ may be initialized, where K is the index dimension and D is the channel dimension. Each particular track may correspond to two outputs from a deep neural network model. The two outputs may indicate onset and framewise pitch of the particular track. Two of the K learnable latent arrays correspond to the two outputs of the particular track, respectively.

At 604, $\theta^0(k)$ may be repeated for T times and associated with each time step t, denoted as $\theta_t^0(k)$, such that all latent arrays are from a same initialization across a time axis. For example, $\Theta^0$ may be repeated for T times and each may be associated to a time step t, which is then denoted as $$\Theta^0_t,$$

such that $$\Theta^0_0 = \Theta^0_1 = \ldots \Theta^0_{T-1}.$$

Thus, all latent arrays may be from the same initialization across the time axis. This $$\Theta^h_t$$

may play an important role of carrying the spectral information throughout the entire deep neural network model.

The query-key-value (QKV) attention of the SCA sub-model 108 of the h-th iteration may be written as:

$$f_{SCA}: \{\Theta^h_t, S_t\} \rightarrow \Theta^{(h+1)}_t.$$

This process may be repeated as the deep neural network model 106 repeats in order to maintain the connection between $$\Theta^h_t$$

and the input $S_t$. The design of the SCA sub-model 108 significantly improves the computational scalability of the deep neural network model 106 as compared to existing AMT systems. For example, the SCA sub-model results in $\mathcal{O}(FK)$, which is much cheaper than $\mathcal{O}(F^2)$ of the spectral Transformer used by an existing technique ("SpecTNT") given that K (dimension of the latent array) is typically small (i.e., K<<F).

To make the temporal transformer sub-model understand the time positions of each latent array, a trainable positional embedding may be added to each latent array during the initialization. At 606, a trainable positional embedding may be added to each latent array in $\theta_t^0(k)$ during a process of initiation so as to enable the set of temporal transformers to understand time positions of each latent array. Let $$\theta_t^h(k),\ k=0,$$

K−1 denote each latent array in $$\Theta_t^h.$$

The temporal transformer sub-model may comprise K parallel transformers. Each of the K parallel transformers may serve the corresponding input sequence of latent arrays:

$$[\theta_0^h(k), \theta_1^h(k), \ldots, \theta_{T-1}^h(k)].$$

FIG. 7 illustrates an example process 700 for implementing training a deep neural network model configured for automatic music audio transcription. Although depicted as a sequence of operations in FIG. 7, those of ordinary skill in the art will appreciate that various embodiments may add, remove, reorder, or modify the depicted operations.

At 702, a loss function for training a deep neural network model may be formulated. The loss function may be formulated as:

$$L=\sum_{j=0}^{J-1}\left[M_j \times \left(l_{onset}^j + l_{frame}^j\right)\right],$$

where l represents a binary cross-entropy loss between ground truth and prediction, $$l_{onset}^j$$

represents an onset activation loss for instrument j, $$l_{frame}^j$$

represents a frame activation loss for instrument j, and $M_j$ represents a mask determined by label availability for instrument j.

At 704, training data may be augmented. The training data may be augmented by randomly mixing a plurality of types of datasets. The plurality of types of datasets may comprise a vocal dataset and an instrument dataset. The plurality of types of dataset may comprise a type of multi-track dataset each sample of which contains multi-tracks of instrument audio stems with polyphonic notes. The plurality of types of dataset may comprise a type of single-track dataset each sample of which contains a single non-vocal audio stem with polyphonic notes. The plurality of types of dataset may comprise a type of vocal-mixture dataset each sample of which contains a full mixture of music audio with monophonic notes for a lead vocal. The augmented training data may be generated using a random-mixing augmentation technique. The random-mixing augmentation technique aims to separate each predefined stem source from the input audio mixture. Instead of using pseudo labels, the combination of different datasets may be used to create more accurate data samples.

At 706, the deep neural network model may be trained using the augmented training data. The deep neural network model may be trained based on the loss function. The deep neural network model may be trained to automatically transcribe music audio comprising vocal and multi-instrument tracks into a plurality of sets of MIDI data corresponding to each of the vocal and multi-instrument tracks.

Figure 8:
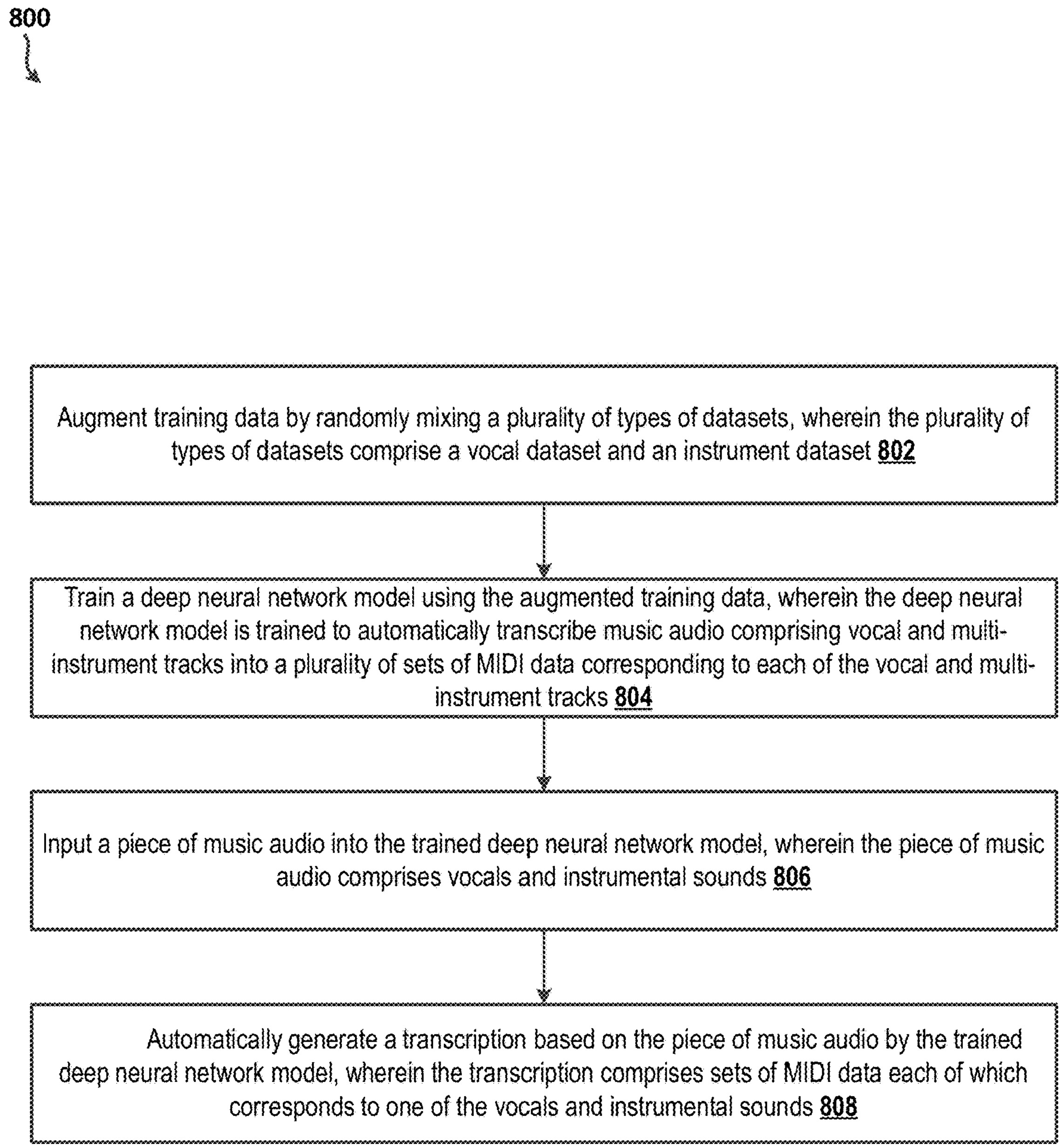
FIG. 8 shows an example process for implementing automatic music audio transcription in accordance with the present disclosure.

FIG. 8 illustrates an example process 800 for implementing automatic music audio transcription. Although depicted as a sequence of operations in FIG. 8, those of ordinary skill in the art will appreciate that various embodiments may add, remove, reorder, or modify the depicted operations.

At 802, training data may be augmented. The training data may be augmented by randomly mixing a plurality of types of datasets. The plurality of types of datasets may comprise a vocal dataset and an instrument dataset. The plurality of types of dataset may comprise a type of multi-track dataset each sample of which contains multi-tracks of instrument audio stems with polyphonic notes. The plurality of types of dataset may comprise a type of single-track dataset each sample of which contains a single non-vocal audio stem with polyphonic notes. The plurality of types of dataset may comprise a type of vocal-mixture dataset each sample of which contains a full mixture of music audio with monophonic notes for a lead vocal. The augmented training data may be generated using a random-mixing augmentation technique. Instead of using pseudo labels, the combination of different datasets may be used to create more accurate data samples. The random-mixing augmentation technique enables more flexibility to train the deep neural network model with enormous amount of augmented training samples At 804, the deep neural network model may be trained using the augmented training data. The deep neural network model may be trained based on a loss function. The deep neural network model may be trained to automatically transcribe music audio comprising vocal and multi-instrument tracks into a plurality of sets of MIDI data corresponding to each of the vocal and multi-instrument tracks.

At 806, a piece of music audio may be input into the system 100 comprising the trained deep neural network model. The piece of music audio may comprise vocals and instrumental sounds. The piece of music audio may comprise a plurality of different instrumental sounds. At 808, a transcription may be automatically generated based on the piece of music audio by the system comprising the trained deep neural network model. The transcription may comprise sets of MIDI data each of which corresponds to one of the vocals and instrumental sounds. For example, the trained deep neural network model may identify every instrument that is present in the music audio input and estimate the associated notes accordingly into a particular channel of the MIDI output. The synthesized audio from the output MIDI may resemble the original input audio in a musically plausible way.

The deep neural network model 106 in FIGS. 1 and 3 described herein was evaluated. The results of the evaluation showed that the trained deep neural network model 106 adequately addresses the model scalability and instrument discrimination problems that existing AMT systems experience. Four public datasets were used for evaluation: for example, a certain public dataset contains 2100 pieces of multitrack MIDI and the corresponding synthesized audio. The official train/validation/test splits were used in the experiments. Another public dataset contains about 200 hours of piano solo recordings with the aligned note annotations acquired by the MIDI capturing device on piano. The official train/validation/test splits were followed. A further public dataset contains 360 high-quality guitar recordings and their synchronized note annotations. The first two progressions of each style may be used for training, and the last one for testing. Another certain public dataset contains 500 pop songs with note annotations for the lead vocal melody. The official train-test split was used.

The audio wave form may be re-sampled to a 16 KHz sampling rate. The model input length may be set to 6 seconds. The log-magnitude spectrogram may then be computed using 2048 samples of Hann window and a hop size of 320 samples (i.e., 20 ms). The convolutional model may contain three residual blocks, each of them having 128 channels and being followed by an average pooling layer with a time-frequency filter of (1, 2).

For the deep neural network model 106, the following parameters were used: (i) depending on different experiment configurations, initialize 2J latent arrays, each uses a dimension of 128; (ii) stack L=3 Perceiver TF blocks; (iii) for each Perceiver TF block, use 1 spectral cross-attention layer, N=2 latent Transformer layers, and M=2 temporal Transformer layers. All of the Transformer layers may have a hidden size of 128 with 8 heads for the multi-head attention. Finally, an output module, which may generate the MIDI output, is a 2-layer Bi-directional GRU with 128 hidden units. All of the Transformer models in the deep neural network model 106 may include dropout with a rate of 0.15. The output dimension for onset and frame activations may be 128 and 129, respectively, where 128 corresponds to the MIDI pitches, and the additional 1 dimension in the frame activation is for the silence. AdamW was used as the learning optimizer. The initial learning rate and weight decay rate were set to $10^{-3}$ and $5\times10^{-3}$, respectively.

For final output, a threshold of 0.25 was used for both the onset and frame probability outputs to acquire the binary representations, so that the onset and frame-wise activations could be merged to generate each note in a piano-roll representation. No further post-processing was applied.

For data augmentation, all of the non-percussive instrument channels of a training example have a 100% probability to be pith-shift up or down by at most 3 semi-tones. For random-mixing, we use p=25% and q=50% for training examples from multi-track and vocal-mixture datasets, respectively.

Two state-of-the-art models, MT3 and SpecTNT, were selected as the baselines. An "Onset F1" score was evaluated for the proposed model and baselines. The Onset F1 score indicates the correctness of both pitches and onset timestamps, as the evaluation metric for comparison with previous work. To further evaluate the performance of multi-instrument transcription, the "Multi-instrument Onset F1" score for the Slakh dataset was also evaluated.

FIG. 9 depicts a table 900. The table 900 shows the comparison in terms of Onset F1 between the proposed model and baselines. Models with (Mix) or (Mix+Vocal) are trained on the mixture of datasets, while models with (Single) are trained on a single dataset. The proposed model and SpecTNT which directly model the spectral inputs with the attention mechanism shows higher performance for cases even trained on low re-sources of a single dataset. On a public vocal dataset, the proposed model significantly outperforms the baselines. Although SpecTNT (Single) performs slightly better than our model on MAE-STRO, the deep neural network model 106 is still more advantageous for practical use due to its better inference efficiency. As shown in the table 900, the deep neural network model of implementing the automatic music transcription in accordance with this disclosure, e.g., the deep neural network model 106, when trained on data augmented using the random-mixing technique, performs better than the baseline models for every instrument.

FIG. 10 depicts a table 1000. The table 1000 presents the multi-instrument Onset F1 (instrument-weighted average) score and the Onset F1 score of individual instrument classes on a public multi-track instrument dataset to reveal instrument-wise performance. Compared to MT3, the deep neural network model described in this disclosure (e.g., the deep neural network model 106) without the random-mixing augmentation (No-RM) performs significantly better on less-common instruments such as "Pipe" (the Onset F1 score is upper by over 100%). Applying random-mixing in training can further boost the performance in all cases, indicating the technique indeed improves the model robustness to discriminate between different instruments. Finally, the table 1000 shows that combining multi-instrument and vocal transcriptions can improve the vocal transcription alone, as the combined model is trained with more randomly mixed vocal-accompaniment samples.

Figure 11:
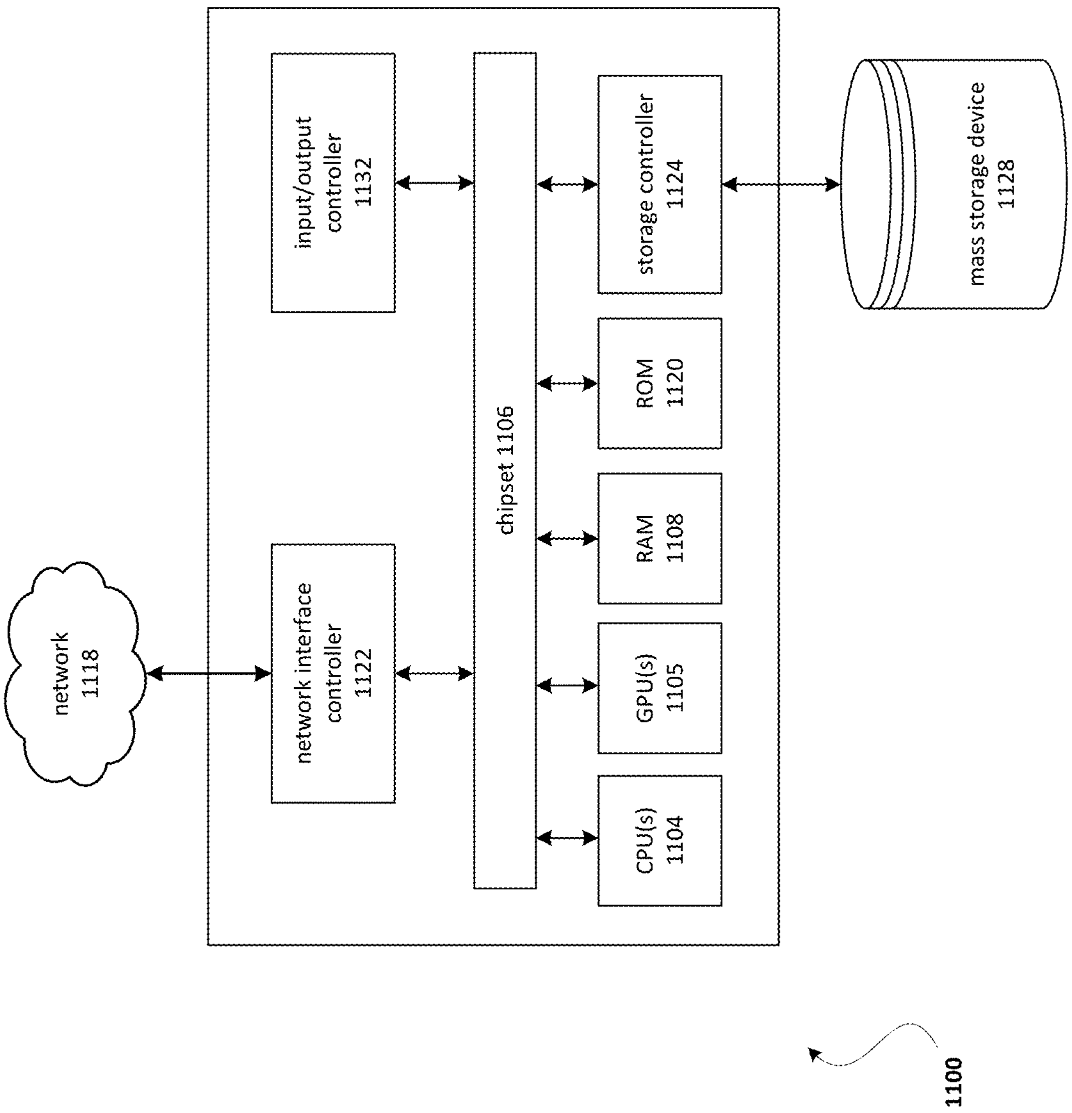
FIG. 11 shows an example computing device which may be used to perform any of the techniques disclosed herein.

FIG. 11 illustrates a computing device that may be used in various aspects, such as the services, networks, modules, and/or devices depicted in FIG. 1 and/or FIG. 3. With regard to the example architecture of FIG. 1 and/or FIG. 3, any or all of the components may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset

1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1110. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for implementing automatic music audio transcription, comprising:

configuring a deep neural network model of implementing the automatic music transcription, wherein the deep neural network model comprises a spectral cross-attention sub-model configured to project a spectral representation of each time step t, denoted as St, into a set of latent arrays at the time step t, denoted as $\theta_t^h$, h representing an h-th iteration, wherein the deep neutral network model comprises a plurality of latent transformers configured to perform self-attention on the set of latent arrays $\theta_t^h$, and wherein the deep neural network model further comprises a set of temporal transformers configured to enable communications between any pairs of latent arrays $\theta_t^h$ at different time steps;

augmenting training data by randomly mixing a plurality of types of dataset, wherein the plurality of types of dataset comprise a vocal dataset and an instrument dataset; and training the deep neural network model using the augmented training data, wherein the deep neural network model is trained to automatically transcribe music audio comprising vocal and multi-instrument tracks into a plurality of sets of MIDI data corresponding to each of the vocal and multi-instrument tracks.

2. The method of claim 1, wherein the configuring a deep neural network model comprises:

initiating a set of K learnable latent arrays $\theta^0(k)$, wherein K is defined based on a number of target tracks of music; and repeating $\theta^0(k)$ for T times and associating with each time step t, denoted as $\theta_t^0(k)$, such that all latent arrays are from a same initialization across a time axis.

3. The method of claim 2, further comprising:

adding a trainable positional embedding to each latent array during a process of initiation so as to enable the set of temporal transformers to understand time positions of each latent array.

4. The method of claim 2, wherein each of the K learnable latent arrays corresponds to a particular track, wherein the set of temporal transformers comprise K temporal transformers, wherein each of the K temporal transformers serves a corresponding input sequence of latent arrays along the time axis, and wherein the corresponding input sequence of latent arrays along the time axis comprises $\theta_0^h(k)$, $\theta_1^h(k)$, . . . , $\theta_{T-1}^h(k)$.

5. The method of claim 4, wherein each particular track corresponds two outputs from the deep neural network model, wherein the two outputs indicate onset and frame-wise pitch of the particular track, and wherein two of the K learnable latent arrays correspond to the two outputs of the particular track, respectively.

6. The method of claim 1, wherein the plurality of types of dataset comprise a type of multi-track dataset each sample of which contains multi-tracks of instrument audio stems with polyphonic notes, a type of single-track dataset each sample of which contains a single non-vocal audio stem with polyphonic notes, and a type of vocal-mixture dataset each sample of which contains a full mixture of music audio with monophonic notes for a lead vocal.

7. The method of claim 1, further comprising:

formulating a loss function for training the deep neural network model, wherein the loss function is formulated as:

$$L = \sum_{j=0}^{J-1}\left[M_j \times \left(l_{onset}^j + l_{frame}^j\right)\right],$$

where l represents a binary cross-entropy loss between ground truth and prediction, $$l_{onset}^j$$

represents an onset activation loss for instrument j, $$l_{frame}^j$$

represents a frame activation loss for instrument j, and $M_j$ represents a mask determined by label availability for instrument j.

8. The method of claim 1, wherein outputs of the spectral cross-attention sub-model are input into the plurality of latent transformers for refining each set of latent arrays at each time step, and wherein outputs of the plurality of latent transformers are input into the set of temporal transformers for processing latent arrays associated with each particular track at all time steps to learn temporal coherence.

9. The method of claim 1, further comprising:

inputting a piece of music audio into a system comprising the trained deep neural network model, wherein the piece of music audio comprises vocals and instrumental sounds; and automatically generating a transcription based on the piece of music audio by the trained deep neural network model, wherein the transcription comprises sets of MIDI data each of which corresponds to one of the vocals and instrumental sounds.

10. A system of extracting a melody, comprising:

at least one processor; and at least one memory communicatively coupled to the at least one processor and comprising computer-readable instructions that upon execution by the at least one processor cause the at least one processor to perform operations comprising:

configuring a deep neural network model of implementing the automatic music transcription, wherein the deep neural network model comprises a spectral cross-attention sub-model configured to project a spectral representation of each time step t, denoted as St, into a set of latent arrays at the time step t, denoted as $\theta_t^h$, h representing an h-th iteration, wherein the deep neutral network model comprises a plurality of latent transformers configured to perform self-attention on the set of latent arrays $\theta_t^h$, and wherein the deep neural network model further comprises a set of temporal transformers configured to enable communications between any pairs of latent arrays $\theta_t^h$ at different time steps;

augmenting training data by randomly mixing a plurality of types of dataset, wherein the plurality of types of dataset comprise a vocal dataset and an instrument dataset; and training the deep neural network model using the augmented training data, wherein the deep neural network model is trained to automatically transcribe music audio comprising vocal and multi-instrument tracks into a plurality of sets of MIDI data corresponding to each of the vocal and multi-instrument tracks.

11. The system of claim 10, wherein the configuring a deep neural network model comprises:

initiating a set of K learnable latent arrays $\theta^0(k)$, wherein K is defined based on a number of target tracks of music; and repeating $\theta^0(k)$ for T times and associating with each time step t, denoted as $\theta_t^0(k)$, such that all latent arrays are from a same initialization across a time axis.

12. The system of claim 11, the operations further comprising:

adding a trainable positional embedding to each latent array during a process of initiation so as to enable the set of temporal transformers to understand time positions of each latent array.

13. The system of claim 11, wherein each of the K learnable latent arrays corresponds to a particular track, wherein the set of temporal transformers comprise K temporal transformers, wherein each of the K temporal transforms serves a corresponding input sequence of latent arrays along the time axis, and wherein the corresponding input sequence of latent arrays along the time axis comprises $\theta_0^h(k)$, $\theta_1^h(k)$, . . . , $\theta_{T-1}^h(k)$.

14. The system of claim 13, wherein each particular track corresponds two outputs from the deep neural network model, wherein the two outputs indicate onset and framewise pitch of the particular track, and wherein two of the K learnable latent arrays correspond to the two outputs of the particular track, respectively.

15. The system of claim 10, wherein outputs of the spectral cross-attention sub-model are input into the plurality of latent transformers for refining each set of latent arrays at each time step, and wherein outputs of the plurality of latent transformers are input into the set of temporal transformers for processing latent arrays associated with each particular track at all time steps to learn temporal coherence.

16. A non-transitory computer-readable storage medium, storing computer-readable instructions that upon execution by a processor cause the processor to implement operations comprising:

configuring a deep neural network model of implementing the automatic music transcription, wherein the deep neural network model comprises a spectral cross-attention sub-model configured to project a spectral representation of each time step t, denoted as St, into a set of latent arrays at the time step t, denoted as $\theta_t^h$, h representing an h-th iteration, wherein the deep neutral network model comprises a plurality of latent transformers configured to perform self-attention on the set of latent arrays $\theta_t^h$ and wherein the deep neural network model further comprises a set of temporal transformers configured to enable communications between any pairs of latent arrays $\theta_t^h$ at different time steps;

augmenting training data by randomly mixing a plurality of types of dataset, wherein the plurality of types of dataset comprise a vocal dataset and an instrument dataset; and training the deep neural network model using the augmented training data, wherein the deep neural network model is trained to automatically transcribe music audio comprising vocal and multi-instrument tracks into a plurality of sets of MIDI data corresponding to each of the vocal and multi-instrument tracks.

17. The non-transitory computer-readable storage medium of claim 16, wherein the configuring a deep neural network model comprises:

initiating a set of K learnable latent arrays $\theta^0(k)$, wherein K is defined based on a number of target tracks of music; and repeating $\theta^0(k)$ for T times and associating with each time step t, denoted as $\theta_t^0(k)$, such that all latent arrays are from a same initialization across a time axis.

18. The non-transitory computer-readable storage medium of claim 17, wherein each of the K learnable latent arrays corresponds to a particular track, wherein the set of temporal transformers comprise K temporal transformers, wherein each of the K temporal transforms serves a corresponding input sequence of latent arrays along the time axis, and wherein the corresponding input sequence of latent arrays along the time axis comprises $\theta_0^h(k)$, $\theta_1^h(k)$, . . . , $\theta_{T-1}^h(k)$.

19. The non-transitory computer-readable storage medium of claim 18, wherein each particular track corresponds two outputs from the deep neural network model, wherein the two outputs indicate onset and framewise pitch of the particular track, and wherein two of the K learnable latent arrays correspond to the two outputs of the particular track, respectively.

20. The non-transitory computer-readable storage medium of claim 16, wherein outputs of the spectral cross-attention sub-model are input into the plurality of latent transformers for refining each set of latent arrays at each time step, and wherein outputs of the plurality of latent transformers are input into the set of temporal transformers for processing latent arrays associated with each particular track at all time steps to learn temporal coherence.

* * * * *